(12) United States Patent
Madden

(10) Patent No.: US 6,577,272 B1
(45) Date of Patent: Jun. 10, 2003

(54) MOVING EMITTER PASSIVE LOCATION FROM MOVING PLATFORM

(75) Inventor: Thomas L. Madden, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/058,256

(22) Filed: Jan. 29, 2002

(51) Int. Cl.⁷ .............................. G01S 5/02; G01S 1/24
(52) U.S. Cl. ...................................... 342/387; 342/442
(58) Field of Search ................................ 342/387, 424, 342/442, 458, 463, 465

(56) References Cited

U.S. PATENT DOCUMENTS

| | | | |
|---|---|---|---|
| 3,568,198 A | | 3/1971 | Borowitz et al. |
| 3,863,257 A | * | 1/1975 | Kang et al. ............. 343/112 D |
| 4,601,025 A | | 7/1986 | Lea |
| 4,673,944 A | * | 6/1987 | Graves ..................... 342/424 |
| 5,302,957 A | * | 4/1994 | Franzen .................... 342/125 |
| 6,255,992 B1 | | 7/2001 | Madden |

* cited by examiner

*Primary Examiner*—Dao Phan
(74) *Attorney, Agent, or Firm*—Gerald B. Hollins; Thomas L. Kundert

(57) ABSTRACT

A moving platform to moving target relative locating apparatus using long baseline interferometer algorithm measurements and signal time difference of arrival data to operate the algorithm. Signal delays measuring in a few picoseconds are used in plural interferometer algorithms to determine straight-line vector paths between moving platform and moving target. Self-calibration of the picosecond time difference of arrival signal paths is provided. Use of the invention to passively locate a moving target in azimuth elevation and range from a moving aircraft using either aircraft-mounted or aircraft-tethered radio frequency signal antennas and a single pulse of received data is also included.

18 Claims, 17 Drawing Sheets

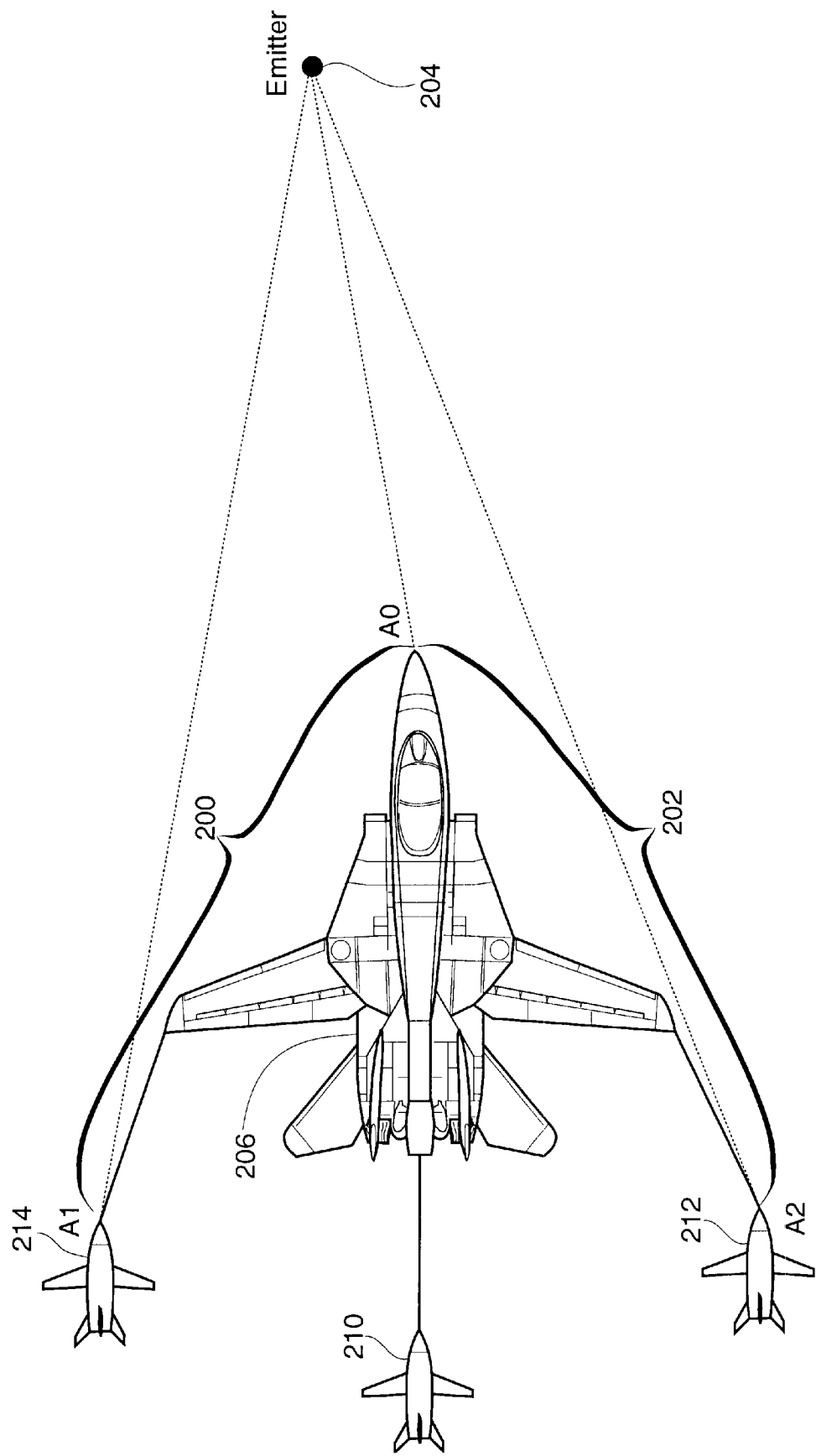

US 6,577,272 B1

MOVING EMITTER PASSIVE LOCATION FROM MOVING PLATFORM

CROSS REFERENCE TO RELATED PATENT DOCUMENTS

The present document is somewhat related to my issued U.S. patent "SELF-CALIBRATING LARGE BASELINE INTERFEROMETER FOR VERY PRECISE EMITTER LOCATION USING TIME DIFFERENCE OF ARRIVAL AND TIME DIFFERENCE OF ARRIVAL RATE", U.S. Pat. No. 6,255,992, issued Jul. 3, 2001, and commonly assigned to The United States of America as represented by the Secretary of the Air Force. The contents of this, my somewhat related issued patent, are hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

In my above-identified U.S. Patent there is disclosed an arrangement for passively determining the location of a fixed-position signal emitter from a moving platform such as an aircraft. The location algorithm described in this issued patent is based on the time difference of arrival (TDOA) of a signal received at different locations on the moving platform from the emitter being located in order to determine a vectorial or azimuthal position of the signal emitter with respect to the moving platform. This location algorithm is also based on a rate of change of the TDOA data to determine the distance between the moving platform and the signal emitter. The algorithm of this issued patent may therefore be considered to be based on the concept of two unknowns being determined by solving two different equations i.e., the unknowns of azimuth and distance being determined from measurement of signal travel time difference and rate of change of signal travel time difference.

If the signal to be located is however moving in position rather than being stationary the algorithm of this issued patent is unable to provide a location of the signal emitter because an additional unknown is added to the "equations" being solved. In this moving signal source instance it can be readily appreciated that the rate of change of travel time difference is determined by both signal emitter movement and platform, i.e., aircraft movement. In order to determine instantaneous emitter location in this moving emitter instance it is apparent that some additional input of data is needed in the location algorithm. As disclosed in the material following, this need for additional input data is easily met and met in a manner that is at first blush strikingly similar to the data sources used in my issued patent but is however, upon system consideration, quite different with respect to the data sources of the issued patent.

SUMMARY OF THE INVENTION

The present invention provides an arrangement for determining the location of, and if desired the velocity of, a moving signal emitter source while the source is observed from a moving platform such as an aircraft. The invention continues the capabilities disclosed in my above-referenced previous patent of being capable of making this location determination during a short time interval, from a short duration emission of the moving emitter and with a system having self calibrating capability.

It is therefore an object of the present invention to provide a moving emitter location system operable from a moving platform such as an aircraft.

It is another object of the invention to provide a moving emitter location system based on the use of easily obtained input signal information.

It is another object of the invention to provide a time based moving platform-received unambiguous locating system for a distant signal source that is also moving.

It is another object of the invention to provide a time based moving platform-received unambiguous locating system providing angle and range information relative to a distant moving target.

It is another object of the invention to provide a time based moving platform-received unambiguous locating system providing angle and range information relative to a distant moving target through use of received radio frequency signals.

It is another object of the invention to provide a moving emitter location system that is self-calibrating in nature.

It is another object of the invention to provide a moving emitter location system based on the use of three signals of somewhat similar nature obtained from displaced signal collectors located on a moving vehicle.

It is another object of the invention to provide a moving emitter location system that is based on the differing arrival times of a radio frequency signal at displaced antennas on a vehicle.

It is another object of the invention to provide a moving emitter location system that is based on the differing arrival times of a radio frequency signal at displaced antennas located on an aircraft.

It is another object of the invention to provide a moving emitter location system based on the differing arrival times of a radio frequency signal at displaced antennas located on a moving aircraft.

It is another object of the invention to identify the location of for example a moving random pulse-to-pulse frequency agile radar emission source from a moving platform.

It is another object of the invention to provide a moving emitter location system based on the use of large baseline signal interferometers.

It is another object of the invention to provide a distant signal source locating arrangement supported by a propagation time-based mathematical algorithm.

These and other objects of the invention will become apparent as the description of the representative embodiments proceeds.

These and other objects of the invention are achieved by passive moving signal source relative-locating apparatus comprising the combination of:

a time difference of arrival interferometer algorithm airborne signal locating system disposed within signal reception range of said moving signal source;

multi-channel signal reception port apparatus disposed in physically segregated locations attending an aircraft carrying said airborne signal locating system;

said multi-channel signal reception apparatus including first signal reception port apparatus disposed on a first physical portion of said aircraft and connected with a receiver apparatus within said aircraft by a first signal delay-calibrated signal transmission path;

said multi-path signal reception apparatus also including second signal reception port apparatus disposed proximate said aircraft and connected with said receiver apparatus within said aircraft by a second signal delay-calibrated signal transmission path;

said multi-path signal reception apparatus also including third signal reception port apparatus disposed proximate said aircraft and connected with said receiver apparatus within said aircraft by a third signal delay-calibrated signal transmission path;

said receiver apparatus within said aircraft including time difference of arrival measurement apparatus selectively connecting with said first, second and third signal reception port apparatus by said first path, second path and third path signal delay-calibrated signal transmission paths respectively;

said time difference of arrival measurement apparatus including angular measurement computation apparatus determining from selected pairs of measured time difference of arrival signals first, second and third angular relationships respectively between said first, second and third signal reception ports of said moving aircraft carrying said airborne signal locating apparatus and said moving airborne signal source;

said time difference of arrival measurement apparatus further including distance computation apparatus determining from selected pairs of said first, second and third angular relationships a straight line measurement between said moving aircraft carrying said airborne signal locating apparatus and said moving airborne signal source.

BRIEF DESCRIPTION OF THE DRAWINGS

The accompanying drawings incorporated in and forming a part of the specification, illustrate several aspects of the present invention and together with the description serve to explain the principles of the invention. In the drawings:

FIG. 2a shows a range and azimuth first alternate approach to implement the present invention.

FIG. 10 shows the result of signal shifting by the analog time delays $\tau_1$ and $\tau_2$ shown in FIG. 6.

DETAILED DESCRIPTION OF THE INVENTION

Traditionally interferometers operate by way of measuring signal phase characteristics. In large baseline interferometers however phase measurement provide ambiguous results because of the cyclic or periodic nature of signal phase data. Time difference of arrival measurements are however not of this ambiguous nature since they are not cyclic or periodic in character. The time difference of arrival measurement arrangement is therefore the theoretical basis for the present invention as is disclosed in the paragraphs following.

By way of comparison, the present-day state of the art enables signal phase measurement to be accomplished within a few degrees of accuracy. Achieving the equivalent accuracy in a measurement accomplished by way of a time difference of arrival algorithm is of course a desired characteristic of a system according to the present invention. The equivalent accuracy for a phase angle difference of 3.6° in a signal of 10 GHz frequency is for example a time difference of arrival of 1 picosecond; such equivalence determines the operating parameters (e.g. the signal delay ranges and delay tolerances) of interest for a system according to the present invention.

Figure 1A:
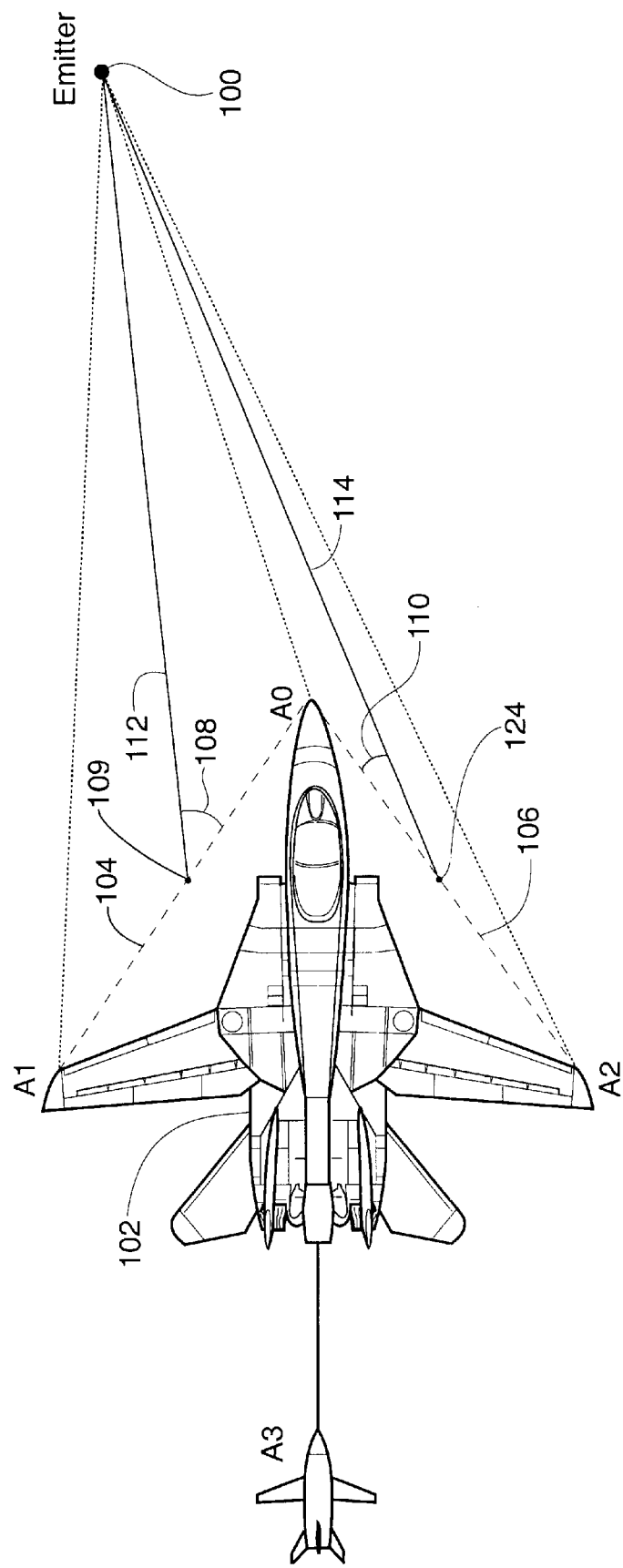
FIG. 1a shows two interferometers used according to the present invention to locate a moving emitter in range and azimuth with respect to a moving platform.
Figure 1B:
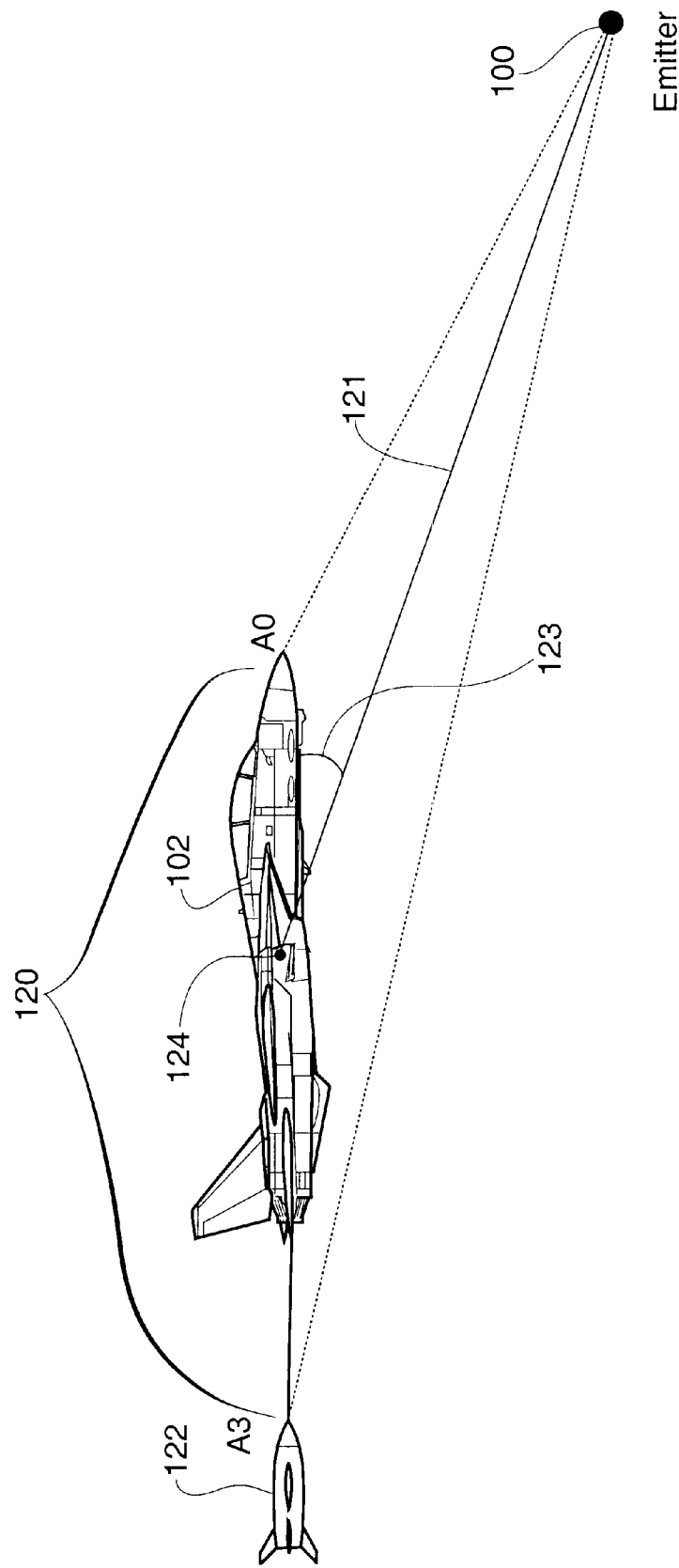
FIG. 1b shows an interferometer additional to the FIG. 1a pair used to locate a moving emitter in elevation.

FIG. 1a and FIG. 1b together show one implementation of a time difference of arrival-based system according to the present invention; collectively these two figures are herein referred to as FIG. 1. The FIG. 1a and FIG. 1b drawings of FIG. 1 are not drawn to scale; the FIG. 1 emitter 100 is assumed to be located many miles from the receiving platform i.e., the aircraft 102. The aircraft 102 may be either manned or unmanned. In the system top view of FIG. 1a two large baseline interferometers, represented by dashed lines 104 and 106, are used to locate the distant radio frequency emitter 100. The emitter 100 may be either moving or stationary.

Each FIG. 1a interferometer (one involving the left wing tip antenna A1 and the nose antenna A0 and the other involving the right wing tip antenna A2 and the nose antenna A0) measures the time difference of arrival of signals from emitter 100 at a different location of the aircraft 102 in order to determine lines of bearing (angles 108 and 110) from the aircraft 102 to the emitter 100. It is notable that the interferometers 104 and 106 are considered to be "located" at the representative midpoints 109 and 124 respectively in both FIGS. 1a and 1b. The intersection of the two lines of bearing, 112 and 114 at the emitter 100, determines the range or distance between the aircraft 102 and the emitter 100. The two interferometers 104 and 106 in the FIG. 1a top view thusly determine azimuth and range from aircraft 102 to emitter 100. The interferometer 120 shown in the FIG. 1b side view (the interferometer formed by the antenna A3 on the tethered platform 122 and the nose antenna A0) may be used to determine elevation angle 123 of the emitter 100 with respect to the aircraft 102. Note that the elevation angle 123 is measured with respect to the center or midpoint 124 of the interferometer 120. In this FIG. 1a and FIG. 1b arrangement the azimuth elevation, and range may be determined simultaneously.

In a first alternate arrangement of the FIG. 1 invention the tethered antenna in FIG. 1b may be deleted and the elevation angle between aircraft 102 and emitter 100 determined sequentially with respect to the azimuth angle and the range through rolling the aircraft by ninety degrees. This alternate arrangement of the invention is however more applicable to a stationary emitter location than to a moving emitter because the azimuth and elevation cannot be measured simultaneously. Therefore because of the appreciable time needed to roll an aircraft a moving emitter will change position during the measurement sequence. Therefore each measurement of elevation and azimuth will be slightly in error for a moving emitter. In another alternate arrangement of the invention the time difference of arrival interferometer data used to determine relative elevation between search platform and signal source aircraft may also be used as a third input for signal source range determination, i.e., as a verification of the two azimuth-based range determinations made with wingtip and nose antennas for example.

Figure 2B:
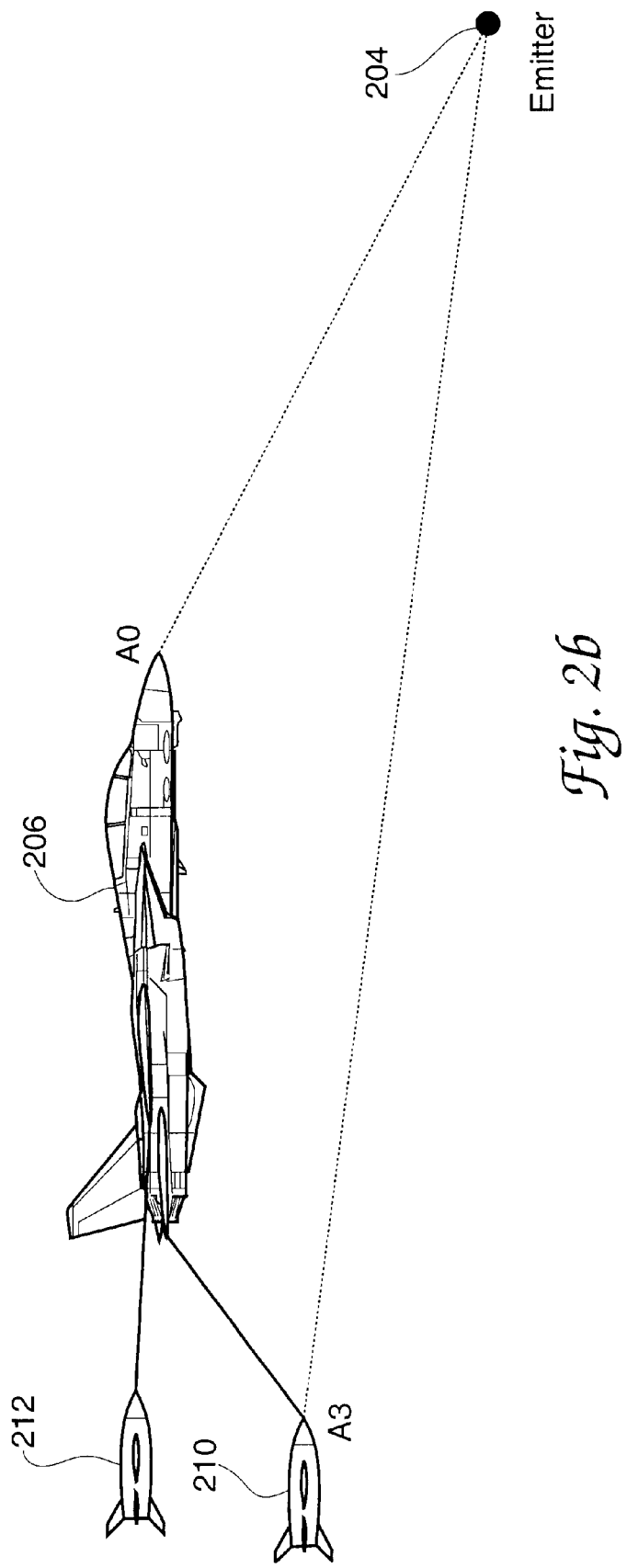
FIG. 2b shows an elevation first alternate approach to implement the present invention.

FIG. 2 in the drawings shows another alternate implementation of the present invention in views identified as FIG. 2a and FIG. 2b. This FIG. 2 implementation using three tethered antennas allows for a large baseline interferometer that is not limited to the size of the host aircraft 206. The FIG. 2 drawings are also not drawn to scale and the emitter 204 is assumed to be located many miles from the aircraft 206. The aircraft 206 may also be either manned or unmanned in nature and the emitter 204 may be either moving or stationary in nature. In the FIG. 2a top view two large baseline interferometers 200 and 202 are used to locate the distant radio frequency emitter 204. The left tethered antenna A1 and the nose antenna A0 form one of the FIG. 2a interferometers and the other is formed by the right tethered antenna A2 and the nose antenna A0.

The two interferometers 200 and 202 in FIG. 2a measure the time difference of arrival of emitter signals at the antennas A0, A1 and A2 to determine two lines of bearing (angle) to the emitter 204. The intersection of these lines of bearing then determines range. The two tethered antennas A1 and A2 are positioned on towed bodies 212 and 214 to provide a baseline of greater dimension than could be achieved from aircraft 206 wing tip antennas. The two interferometers 200 and 202 in the FIG. 2a view therefore determine azimuth and range from aircraft 206 to emitter 204. The interferometer shown in the FIG. 2b side view (formed by the tethered antenna A3 and the nose antenna A0) is then used to determine elevation from aircraft 206 to emitter 204. In this arrangement the azimuth, elevation, and range are also determined simultaneously.

In an alternate arrangement of the FIG. 2 embodiments of the invention the tethered antenna 210 may be deleted and the elevation angle determined sequentially to the azimuth angle and range by changing the position of A1 and A2 so that they are widely separated vertically. Once so repositioned the large baseline interferometer formed by A1 and A2 could thus determine elevation. This alternate configuration is also more applicable to a stationary emitter than a moving one because the moving emitter will change position during the sequential measurements.

Figure 3A:
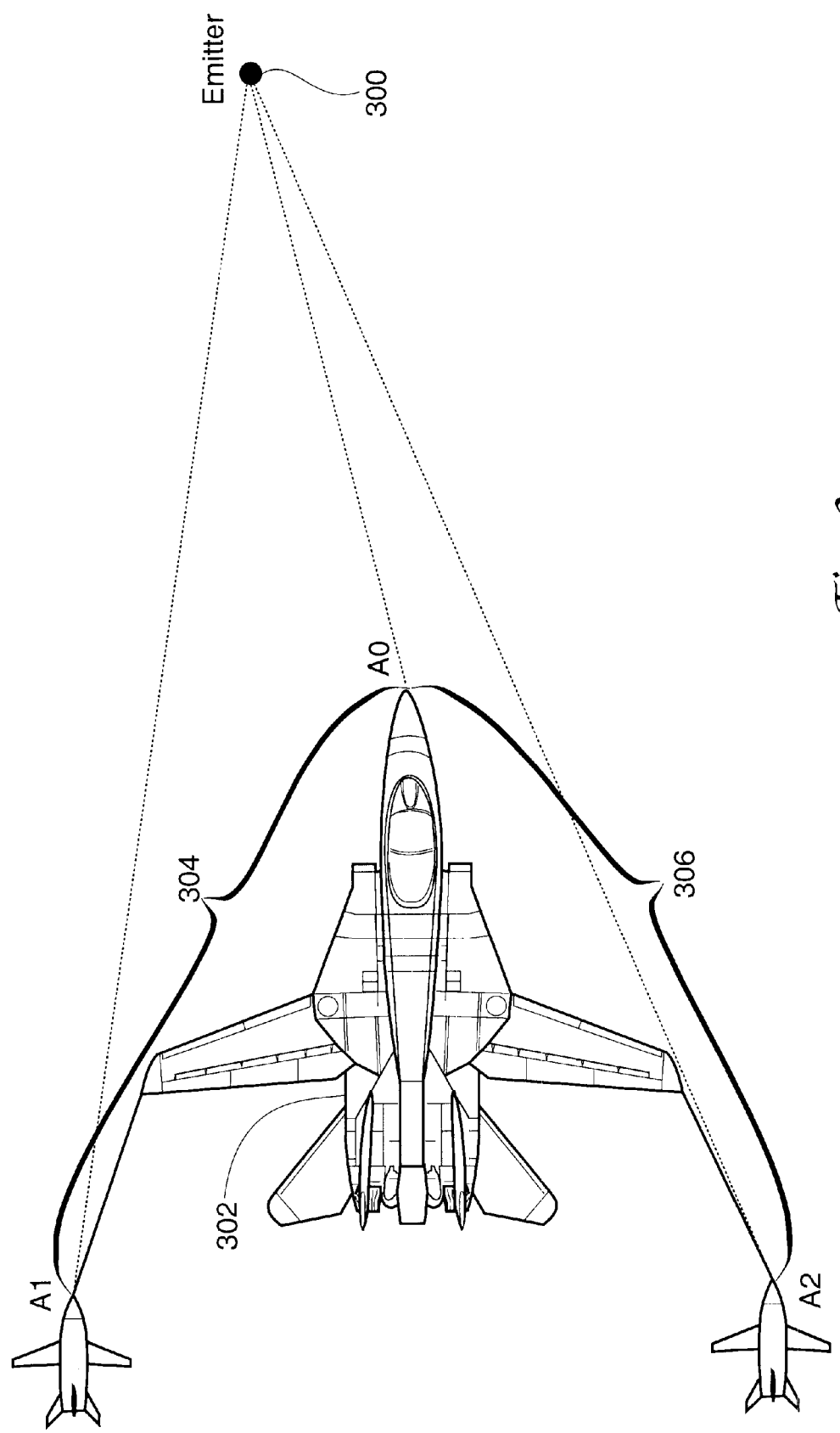
FIG. 3a shows a range and azimuth second alternate approach to implement the present invention.
Figure 3B:
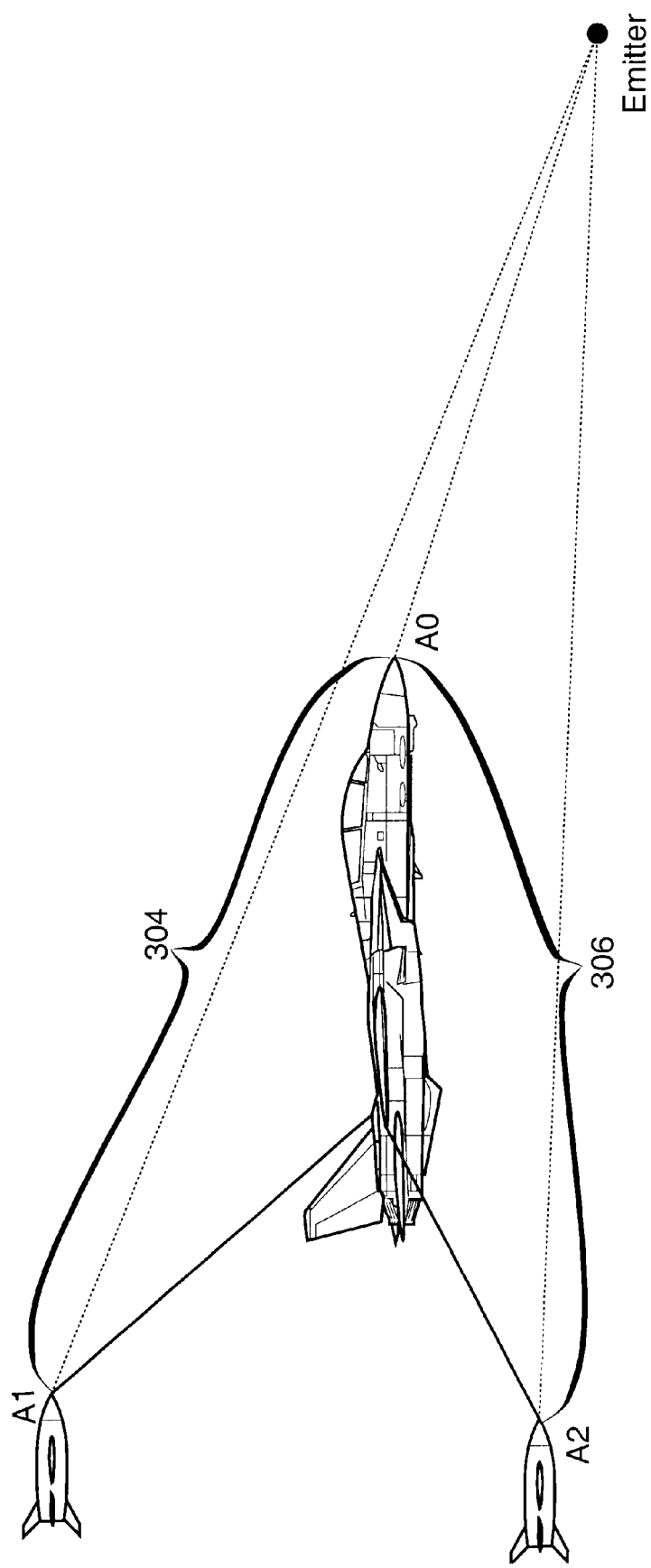
FIG. 3b shows an elevation second alternate approach to implement the present invention.

The views of FIG. 3a and FIG. 3b, i.e., FIG. 3 in the drawings, show another alternate implementation of the present invention. This implementation using two tethered antennas also allows for a large baseline interferometer that is not limited to the size of the aircraft for determining elevation and range. The FIG. 3 drawings are also not to scale with the emitter 300 being many miles from the aircraft 302. The aircraft 302 could be either manned or unmanned and the emitter 300 could be either moving or stationary. In the FIG. 3 top view of FIG. 3a two large baseline interferometers 304 and 306 are used to locate the distant radio frequency emitter 300. The left side antenna A1 and the nose antenna A0 form one of the interferometers 304 and the right side antenna A2 and the nose antenna A0 form the other interferometer. The single aircraft nose antenna A0 may of course be replaced with a pair of antennas, one for each interferometer 304 and 306, if desired. The two interferometers 304 and 306 measure the time difference of arrival of an emitter 300 signal at the FIG. 3 antennas A1 and A2 to determine two lines of bearing (angle) to the emitter 300. The intersection of these lines of bearing then determines range.

The FIG. 3 tethered antennas A1 and A2 are positioned to provide a large horizontal baseline, a baseline greater than could be achieved on the aircraft 302. The two interferometers in the FIG. 3a top view therefore determine emitter azimuth and range. These same two FIG. 3a antennas also form the elevation interferometers shown in the side view of FIG. 3 when combined with the FIG. 3b nose antenna A0 to determine emitter elevation. Since the vertical separation of the two FIG. 3b tethered antennas can be greater than the vertical separation of aircraft wing tip antennas this larger baseline can determine a more accurate emitter elevation measurement. Actually, only one of the two tethered bodies A1 and A2 need to be positioned either above or below the horizontal flight plane of aircraft 302, to determine elevation angle. The interferometers in FIG. 3b are identified with the same numbers 304 and 306 used in FIG. 3a since in fact they are same interferometers used in the FIG. 3a azimuth and range determination.

For language convenience purposes the FIG. 1 through FIG. 3 interferometer arrangements, arrangements including both aircraft mounted and aircraft-tethered antennas, may be referred-to generically as involving aircraft-proximate antenna dispositions.

Figure 4:
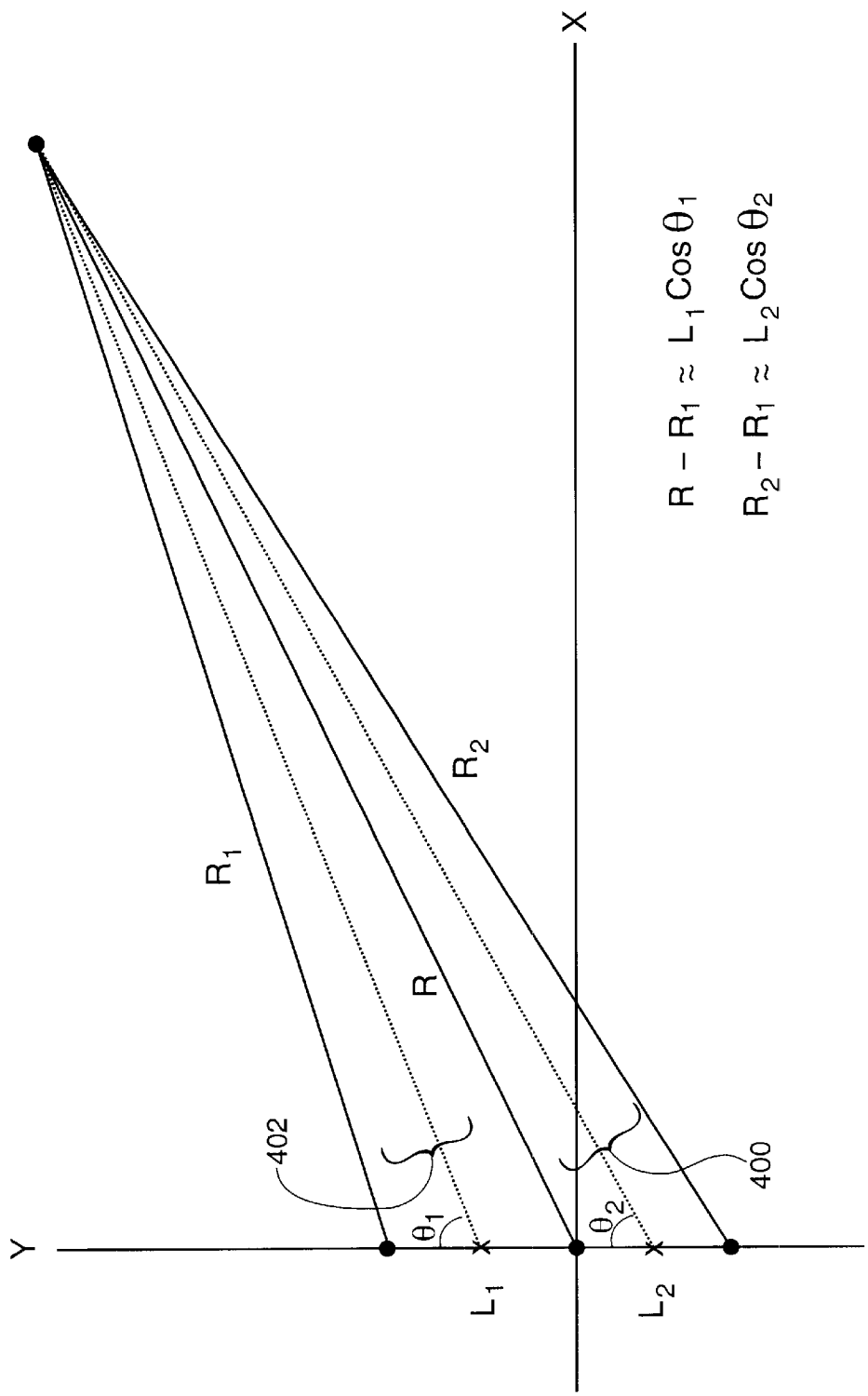
FIG. 4 shows two large baseline interferometers used to determine both angle and range to an emitter.

The mathematical basis for the moving emitter location from passive moving platform system of the present invention is now considered. FIG. 4 in the drawings shows a generalized signal path drawing for a three-element interferometer. In the FIG. 4 drawing three antennas form two large baseline interferometers 400 and 402. Assuming the FIG. 4 lines R1 and R are parallel the following equation can be written.

$$R - R_1 = L_1 \cos \theta_1 \qquad (1)$$

Then assuming that R2 and R are parallel the following equation can be written:

$$R_2 - R = L_2 \cos \theta_2 \qquad (2)$$

Then dividing equations (1) and (2) by c, the speed of light we obtain $$TDOA_1 = L_1/c \cos \theta_1 \qquad (3)$$

$$TDOA_2 = L_2/c \cos \theta_2 \qquad (4)$$

Equation (3) and (4) can then be solved for θ giving $$\theta_1 = \cos^{-1}(TDOA_1 * c/L_1) \qquad (5)$$

$$\theta_2 = \cos^{-1}(TDOA_2 * c/L_2) \qquad (6)$$

Now making the counter intuitive assumption that $\theta_1$ and $\theta_2$ are not parallel the following equations can be written for the dotted lines connecting the emitter and each x which represents the center of each interferometer.

$$y = (\cot \theta_1) x + L_1/2 \quad (7)$$

$$y = (\cot \theta_2) x - L_2/2 \quad (8)$$

The above two simultaneous equations can now be solve for the (X, Y) intersection.

$$X = \frac{(L_1 + L_2)/2}{\cot\theta_2 - \cot\theta_1} \quad (9)$$

$$Y = \frac{(L_1 \cot\theta_2 + L_2 \cot\theta_1)/2}{\cot\theta_2 - \cot\theta_1} \quad (10)$$

Finally range can be determined from the X and Y intersection on the two lines of bearing (the dotted lines on FIG. 4).

$$R = \sqrt{X^2 + Y^2} \quad (11)$$

Figure 5:
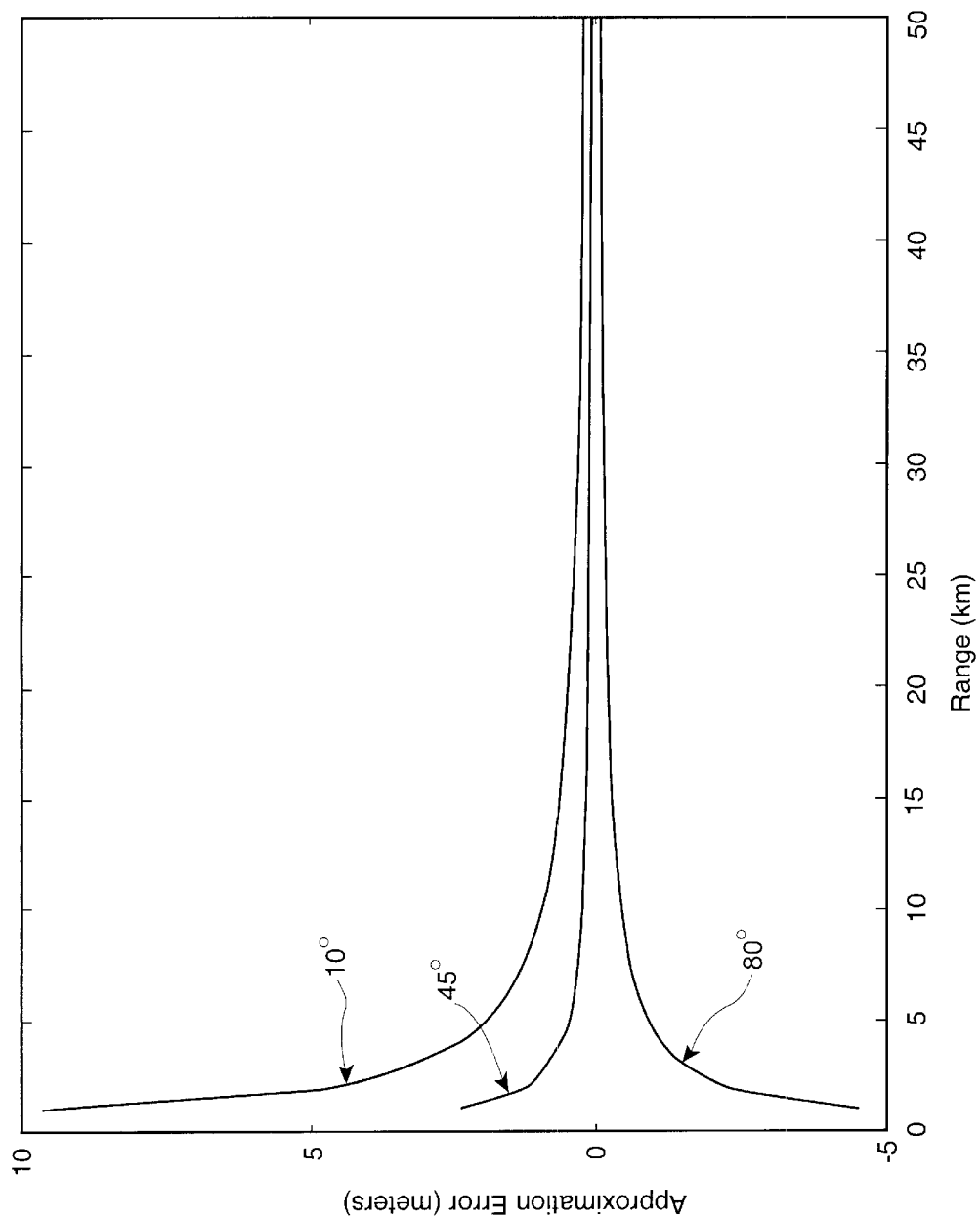
FIG. 5 shows the small errors produced by mathematical assumptions incorporated in the algorithm of the present invention.

FIG. 5 in the drawings shows the error produced by the assumptions that equations (1) and (2) are correct and that $\theta_1$ and $\theta_2$ are not parallel. The two assumptions are actually inconsistent mathematically. However FIG. 5 demonstrates that the actual error produced by these assumptions is small. The FIG. 5 drawing plots the error in meters against range in kilometers for three different values of line of bearing angle, $\theta$. FIG. 5 shows the maximum range error is less than 10 meters at 1 km for $\theta$ between 10 and 80 degrees. This is less than one percent (1%) error. At 10 km the range error is less that 1 meter (0.01%) over the angular extent of 10 to 80 degrees. At longer ranges the error is even less. Based on FIG. 5 it thus can be seen that these two inconsistent mathematical assumptions introduce a small error. This is significant with respect to the invention providing an accurate estimate of range to the emitter.

Figure 6:
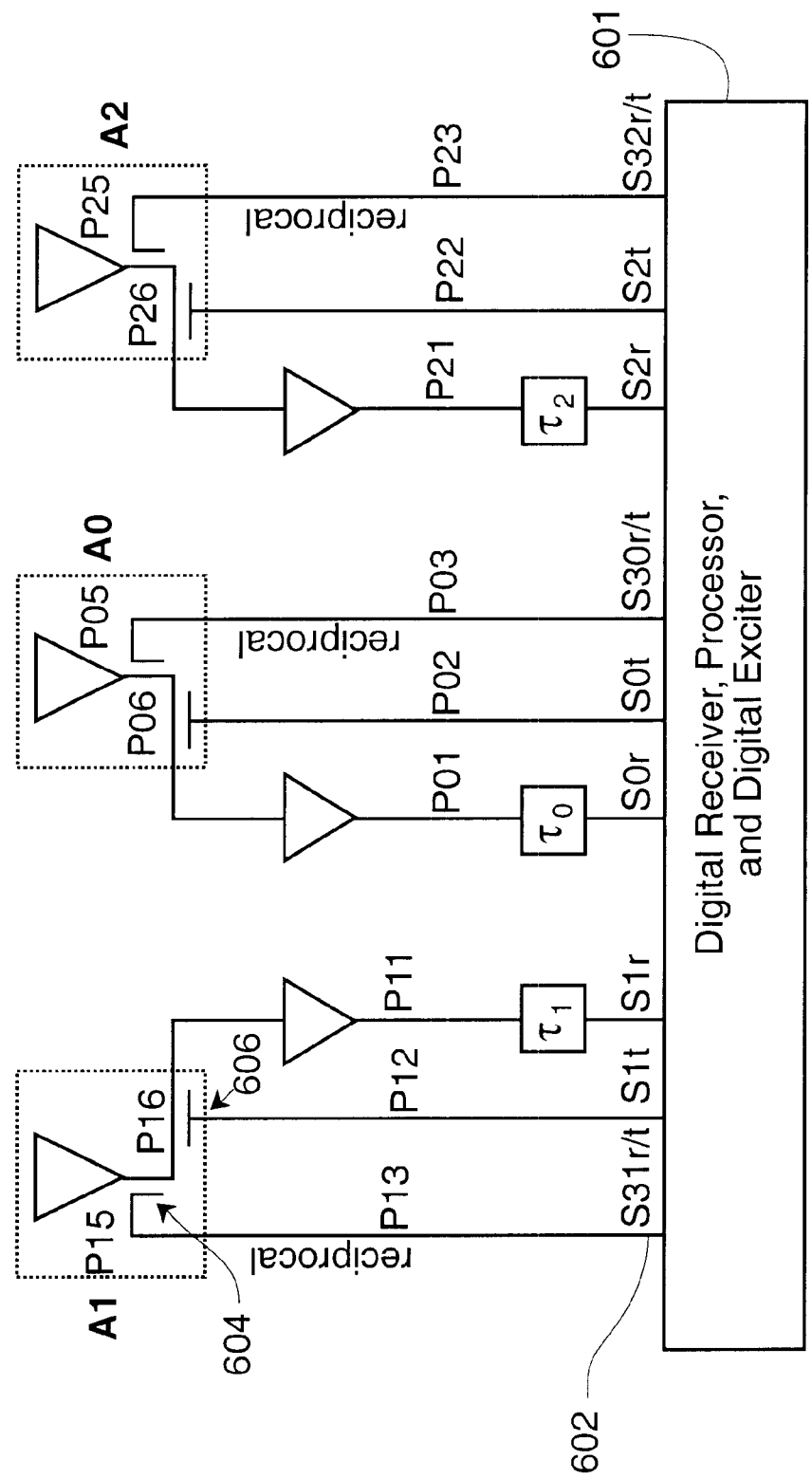
FIG. 6 shows a self-calibration arrangement usable by the invention.
Figure 7:
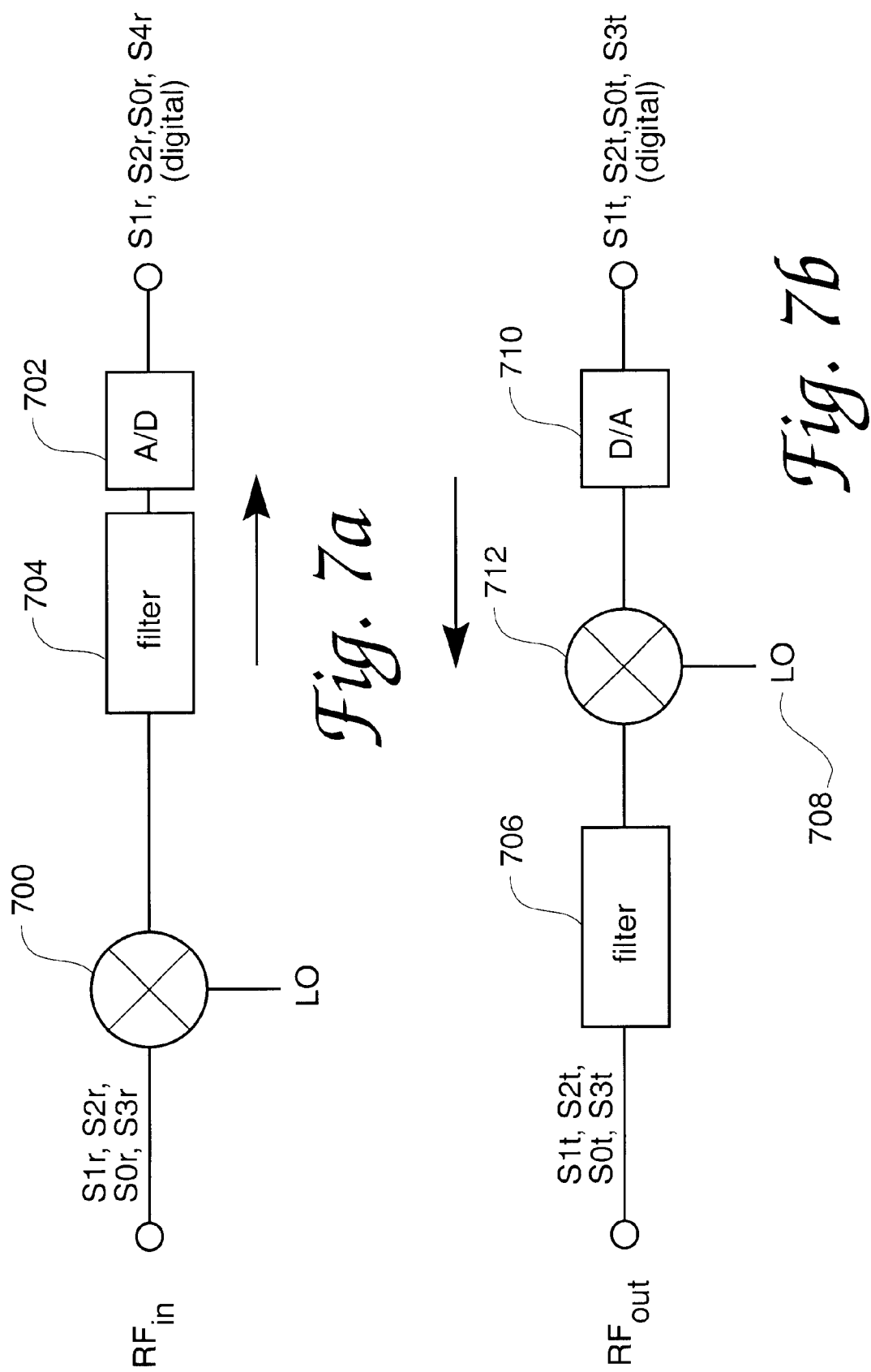
FIG. 7a shows most significant internal details of the FIG. 6 and FIG. 12 receiver/processor/exciter of blocks 601 and 1201.
FIG. 7b shows additionally significant internal details of the FIG. 6 and FIG. 12 receiver/processor/exciter of blocks 601 and 1201.
Figure 8:
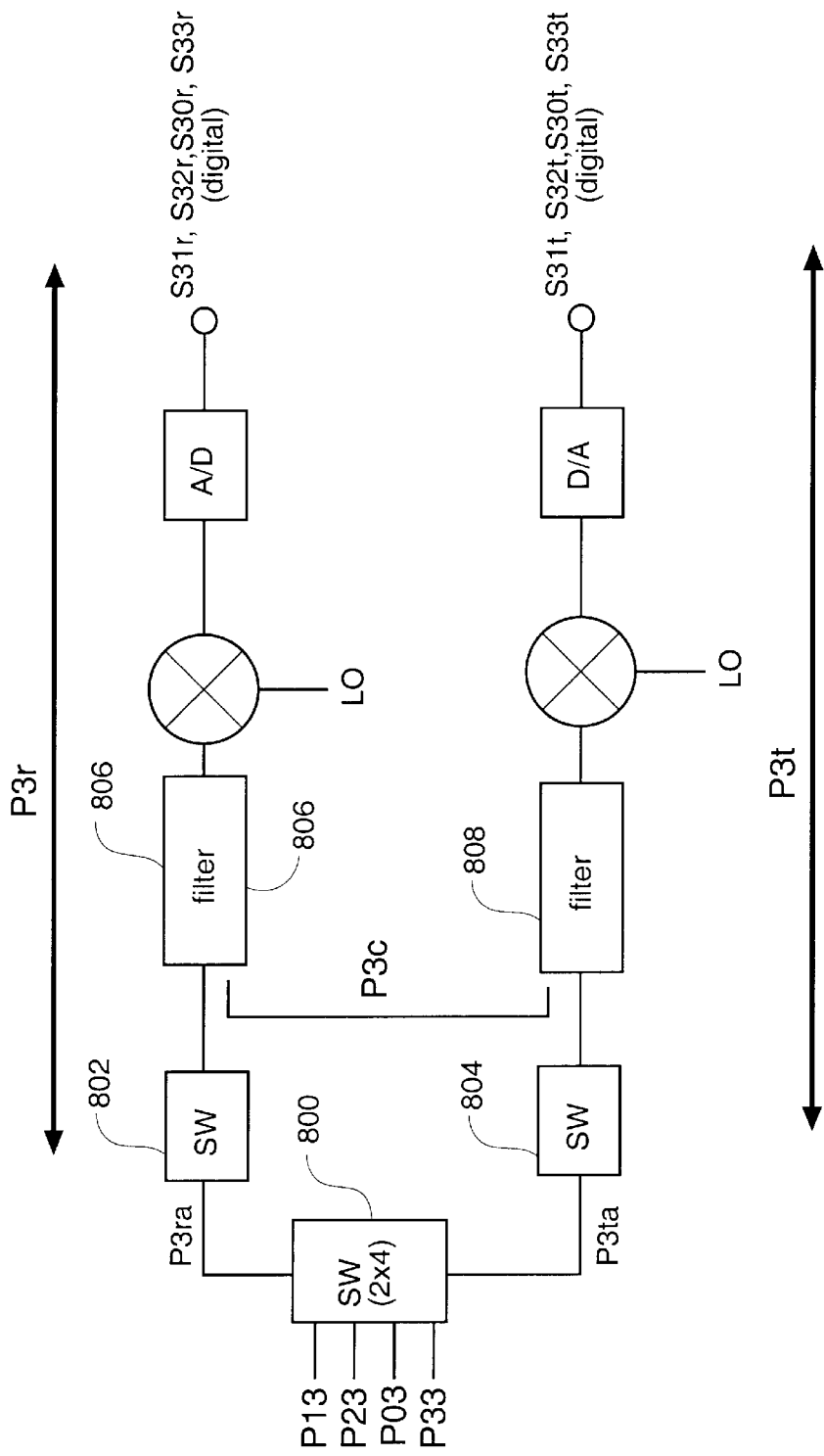
FIG. 8 shows additional details of the FIG. 6 self-calibration apparatus.

Self-Calibration of the FIG. 6, FIG. 7, and FIG. 8 Three Element Interferometer FIG. 6, FIG. 7, and FIG. 8 in the drawings disclose a three element self calibrating interferometer establishing and maintaining the function of the invention. FIG. 7 in these drawings includes the two views of FIG. 7a and FIG. 7b. In considering the FIG. 6 drawing it is helpful to recall that the objective of the invention is to measure the time difference of arrival (TDOA) between antennas A0 and A1 and between antennas A0 and A2. The FIG. 6 system however inherently measures the TDOA at the input to the digital receiver 601 and not at the input to the antennas A0, A1 and A2. In other words signal delays in system transmission lines need to be considered with respect to accuracy characteristics of the invention—especially in view of the picoseconds signal resolution range mentioned above herein. Considering the signal delay and timing relationships occurring in the FIG. 6 system we can therefore mathematically define:

$$P15 + P16 + P11 = P1 \quad (12)$$

$$P05 + P06 + P01 = P0 \quad (13)$$

$$P25 + P26 + P21 = P2 \quad (14)$$

Then if P1=P2=P0 the measurement of TDOA at the digital receiver 601 is the same as the TDOA at the input to the antennas. If P1, P2, and P0 are not the same but the relative value of P1 with respect to P0 and the relative value of P2 with respect to P0 are known then the TDOA measured at the digital receiver 601 can be used to determine the TDOA at the antennas. Additional details regarding the self-calibration part of the invention appear in my above-identified U.S. Patent.

In general the self-calibration concept is as follows. First it may be assumed that short passive signal paths can be calibrated with respect to signal delay in the factory or during maintenance and once so calibrated they will remain calibrated. These paths may change physical and delay length with temperature however a temperature sensor such as a thermocouple can be used to measure the temperature change and correct delay changes by means of a look up table or a simple correction algorithm. The paths needing to be calibrated are therefore the long paths and paths with active components such as amplifiers. Specifically paths P01, P11, and P21 in FIG. 6 need calibration. In FIG. 6 an additional six paths are shown merely to calibrate the three paths P01, P11, and P21. To explain the calibration process one needs to consider FIG. 6, FIG. 7 and FIG. 8 and their relationship. Generally FIG. 6 is an overall figure and FIG. 7 and FIG. 8 represent details of apparatus inside the box 601.

FIG. 7a shows receiver functions connected to the inputs S1r, S0r and S2r of FIG. 6. The FIG. 7a function is to convert the receiver input signal from a high frequency to a lower frequency that can be sampled by the analog to digital (A/D) converter 702. There may be multiple stages of down conversion in lieu of the single stage shown at 700. There may also be multiple stages of signal amplification to offset the loss of the mixer 700 or multiple mixers. Since a mixer produces two sidebands, the FIG. 7a filter 704 serves to allow only the desired sideband frequency to pass in the FIG. 7a receiver. FIG. 7b shows the up conversion from a digital signal to the high frequency signal that is used for calibration in the FIG. 6 system. This FIG. 7b up conversion can also be accomplished in multiple stages. The local oscillator signal at 708 (LO) is from the same source for both the up and down conversions accomplished in FIG. 7 and FIG. 8; this local oscillator signal provides the second input for the signal mixer circuit 712 in the FIG. 7b apparatus. Signal modification from analog to digital signals and from digital to analog signals occurs in the respective converter circuits 702 and 710 in FIG. 7a and FIG. 7b.

Details regarding the typical signal couplers shown at 604 and 606 in FIG. 6 in connection with the antennas A0, A1 and A2 may be better understood from explanations of the similar components appearing in my issued, and incorporated by reference herein, patent identified above. In particular the drawings of FIG. 2 and FIG. 8 in this issued patent and the related discussions in columns 9 and 10 of the patent specification are relevant.

The FIG. 6 self-calibration is accomplished as follows: First a signal is injected into path P11 from the S31t portion of the S31r/t port at 602. If the delay of path P13 were known then path P11 would be calibrated. However, the delay of path P13 is not known. P13 in fact represents a long path from the center portion of the aircraft to one wing tip. By adding another unknown path P12 to inject a signal into both paths P11 and P13 via coupler 606 all three paths can however be calibrated. The relevant three equations and three unknowns are as follows. These delay time equations are formulated starting in FIG. 8, going to FIG. 6 and ending in FIG. 7 for the first equation, equation 15.

$$S31t + P3t + P3ta + P13 + P16 + P11 = S1r \quad (15)$$

Starting in FIG. 7b, going to FIG. 6 and ending in FIG. 7a for the second equation, equation 16.

$$S1t+P12+P11=S1r \tag{16}$$

And finally staring in FIG. 7b, going to FIG. 6 and ending in FIG. 8 for the third equation, equation 17.

$$S1t+P12+P16+P13+P3ra+P3r=S31r \tag{17}$$

These three equations can then be written in matrix form $$\begin{bmatrix} 1 & 0 & 1 \\ 1 & 1 & 0 \\ 0 & 1 & 1 \end{bmatrix} \begin{bmatrix} P11 \\ P12 \\ P13 \end{bmatrix} = \begin{bmatrix} S1r31t - P16 - P3t - P3ta \\ S1r1t \\ S31r1t - P16 - P34 - P3ra \end{bmatrix} \tag{18}$$

For equation (18) it is assumed that all the paths in the right matrix are known. Also the notation is change to represent S1r–S31t by the short hand notation of S1r31t, S1r–S1t by S1r1t, and S31r–S1t by S31r1t. Note in FIG. 8 that both P3t and P3r are not passive in nature so in reality are uncalibrated. Additionally in FIG. 8 the blocks labeled "SW" at 800, 802 and 804 represent switches. The 802 and 804 switches are open to prevent signal transmission to the FIG. 6 system and to prevent external signal reception during the calibration of P3r and P3t. The 2 by 4 way switch 800 is used to switch the path P3ta into paths P03, P13, P23, or P33 during the calibration process. The switch 800 also allows switch of paths P03, P13, P23, or P33 into path P3ra during the calibration process. The filters at 806 and 808 in FIG. 8 serve to allow only the desired frequency to pass after the mixing function. Also note in FIG. 8 that P3t+P3r can be calibrated by the following equation 19:

$$S31t+P3t+P3c+P3r=S31r \tag{19}$$

Equation (19) can then be solved for P3t+P3r. The result is $$P3t+P3r=S31r31t-P3c \tag{20}$$

Since P3c is a short factory calibrated path with a temperature monitor, P3t+P3r is deemed to be calibrated.

Now let us return our attention to the matrix equation (18) and solve for P11. The first step is to solve the matrix equation, which gives:

$$\begin{bmatrix} P11 \\ P12 \\ P13 \end{bmatrix} = \begin{bmatrix} .5 & .5 & -.5 \\ -.5 & .5 & .5 \\ .5 & -.5 & .5 \end{bmatrix} \begin{bmatrix} S1r31t - P16 - P3t - P3ta \\ S1r1t \\ S31r1t - P16 - P3r - P3ra \end{bmatrix} \tag{21}$$

From equation (21) P11 is:

$$P11=0.5\{(S1r31t+S1r1t-S31r1t)+(P3r-P3t)+(P3ra-P3ta)\} \tag{22}$$

This can be rewritten as:

$$P11=0.5\{(S11)+(P3r-P3t)+(P3ra-P3ta)\} \tag{23}$$

where S11=the three measured TDOA's from equation (22). Note that P3ra and P3ta are short passive paths, paths which can be calibrated in the factory. The factory arrangement may be disposed such that P3ra=P3ta when delivered and the term can be dropped from equation (22).

If the system is manufactured such that P3ra=P3ta then equation (22) can be rewritten as:

$$P11=0.5*S11+0.5(P3r-P3t) \tag{24}$$

Following a similar development for P11 above, P01 and P21 can also be determined. The two equations are as follows:

$$P01=0.5*S01+0.5(P3r-P3t) \tag{25}$$

$$P21=0.5*S21+0.5(P3r-P3t) \tag{26}$$

Note that P11, P01, and P21 have not been calibrated because the value (P3r–P3t) is uncalibrated (i.e., contains nonlinear devices and may vary during operational use from the values at acceptance testing at the factory). However, during the above self-calibration process P11, P01, and P21 have been determined with the same error term for each. This error term is P3r–P3t.

Since the purpose of the invention is to measure TDOA and not absolute time of signal arrival at the antennas the self-calibration results of equations (24), (25), and (26) are sufficient. That is the TDOA between antennas 0 and 1 is:

$$TDOA\_a=TDOA\_m+(P11-P01) \tag{27}$$

where TDOA_a is the desired TDOA at the two antennas and TDOA_m is the measured TDOA at the receiver. Substituting for P11 and P01 in equation (27) gives:

$$TDOA\_a=TDOA\_m+0.5(S11-S01) \tag{28}$$

and since S11 and S01 are measured TDOA's during the self-calibration process TDOA_a has been determined!

Measurement of Time of Arrival in the Digital Receiver

Figure 9:
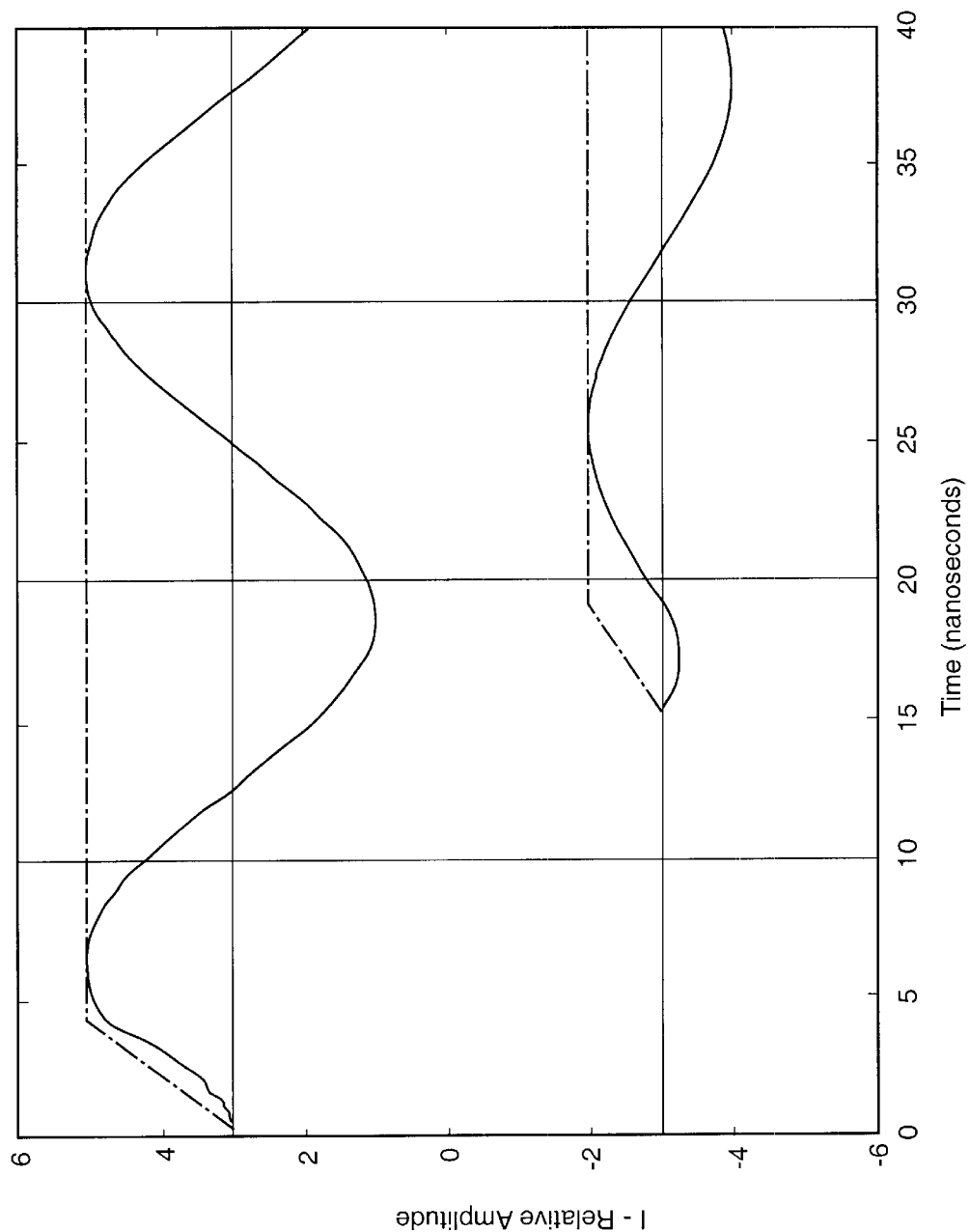
FIG. 9 shows a representative modified down converted signal prior to sampling.
Figure 10A:
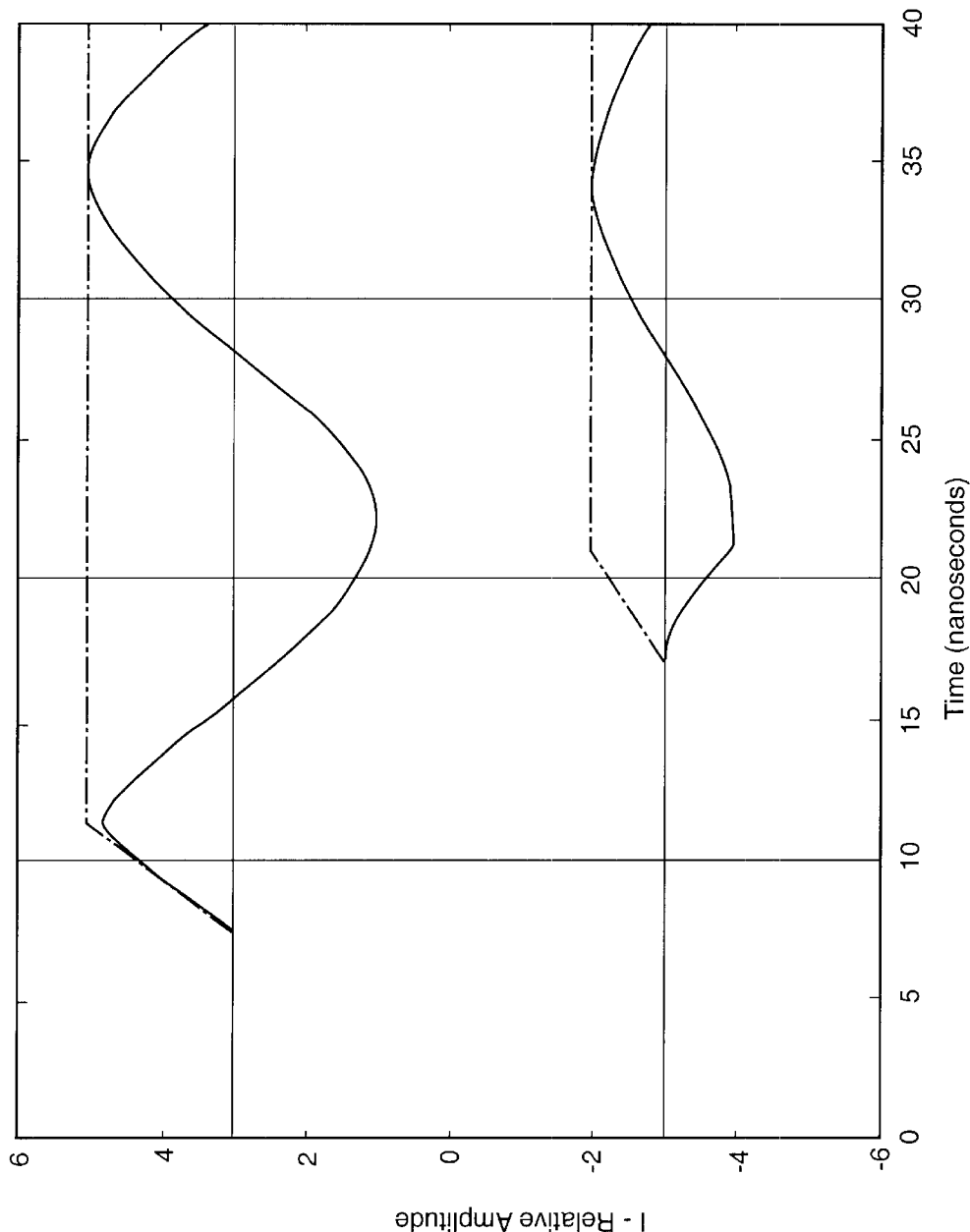
FIG. 10a shows the in-phase component of the FIG. 10 shifted signal.
Figure 10B:
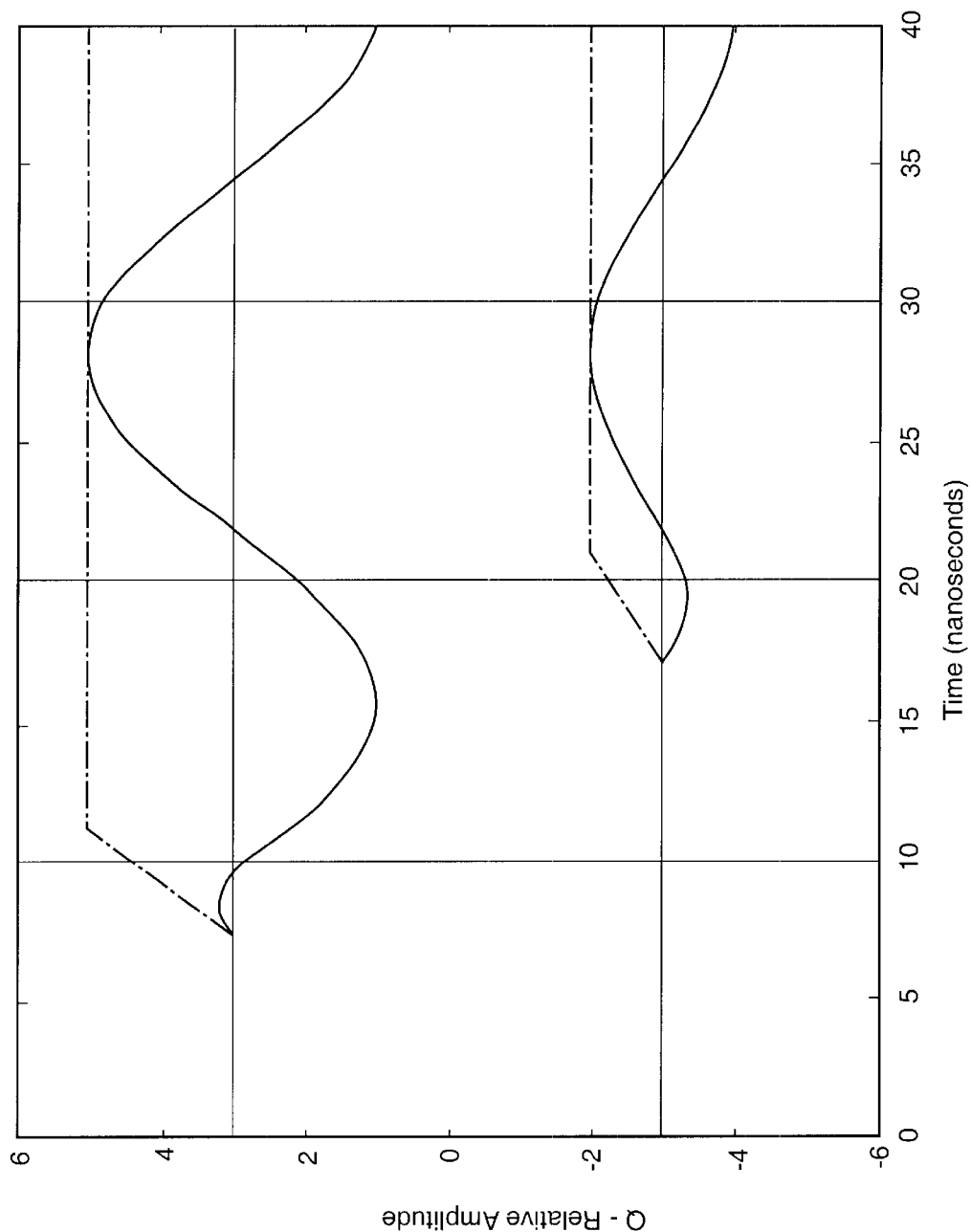
FIG. 10b shows the quadrature component of the FIG. 10 shifted signal.
Figure 10C:
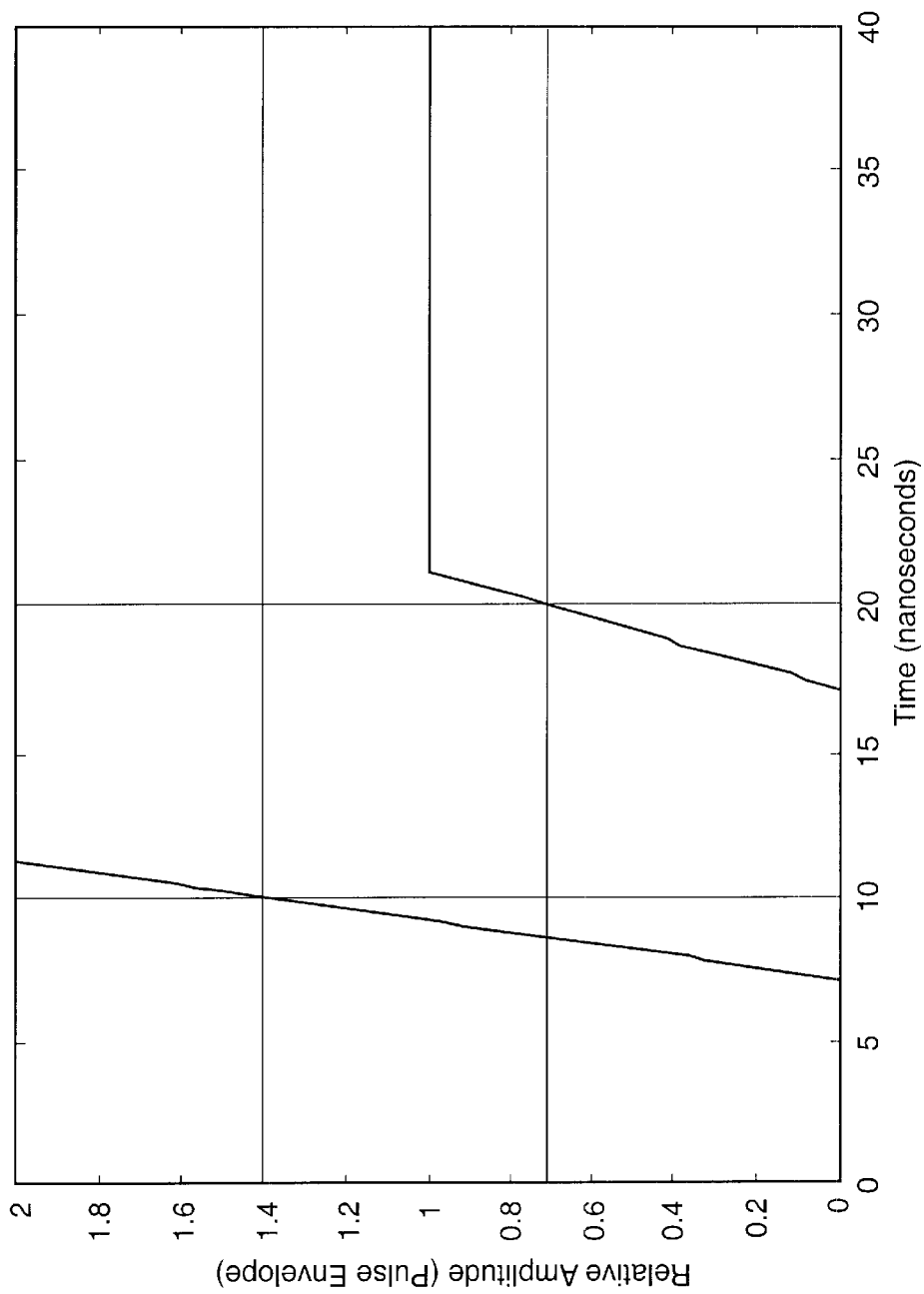
FIG. 10c shows the envelope of the FIG. 10 shifted signal.
Figure 11:
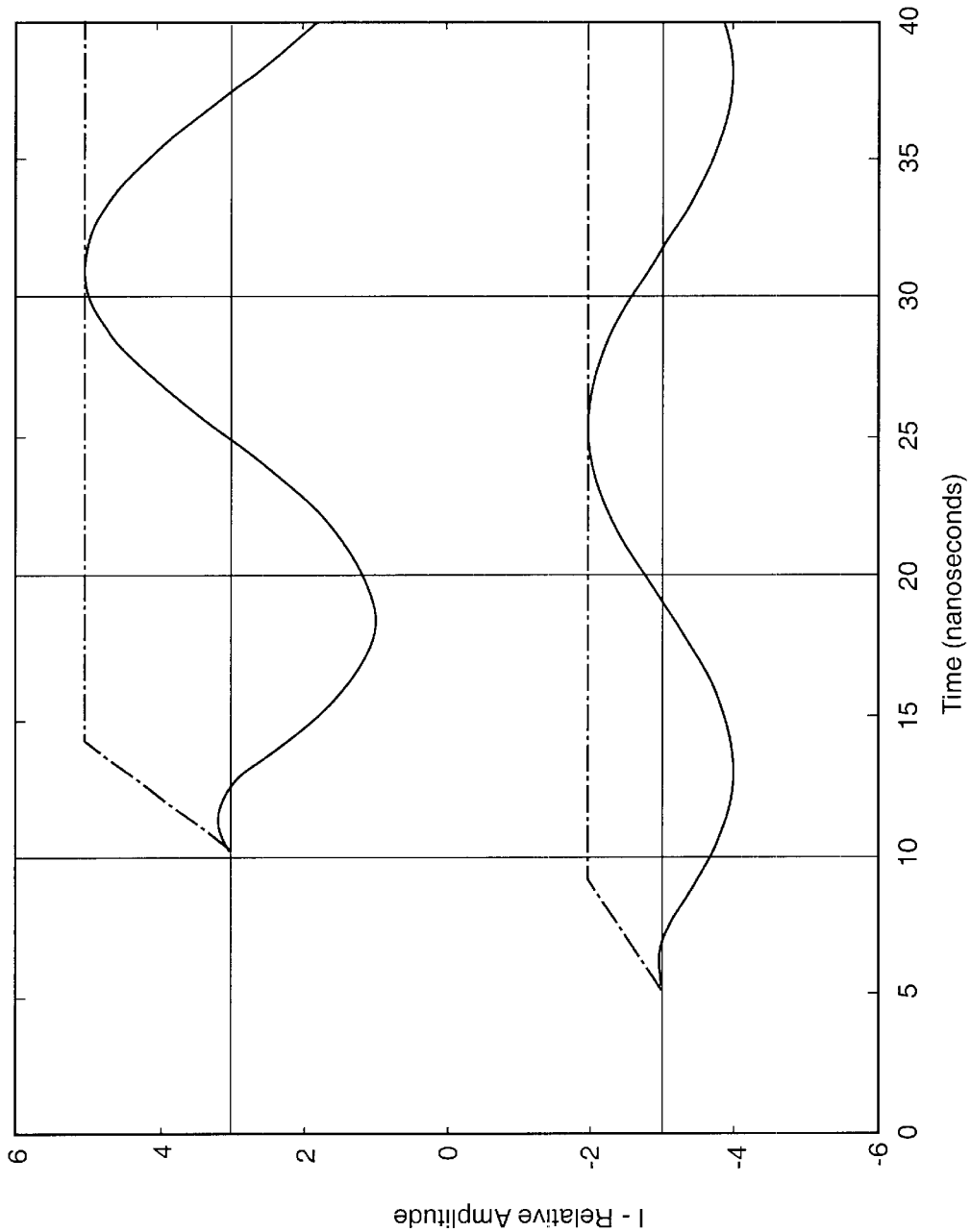
FIG. 11 shows a second received down converted signal model, an envelope-multiplied continuous wave signal, prior to sampling.
Figure 12:
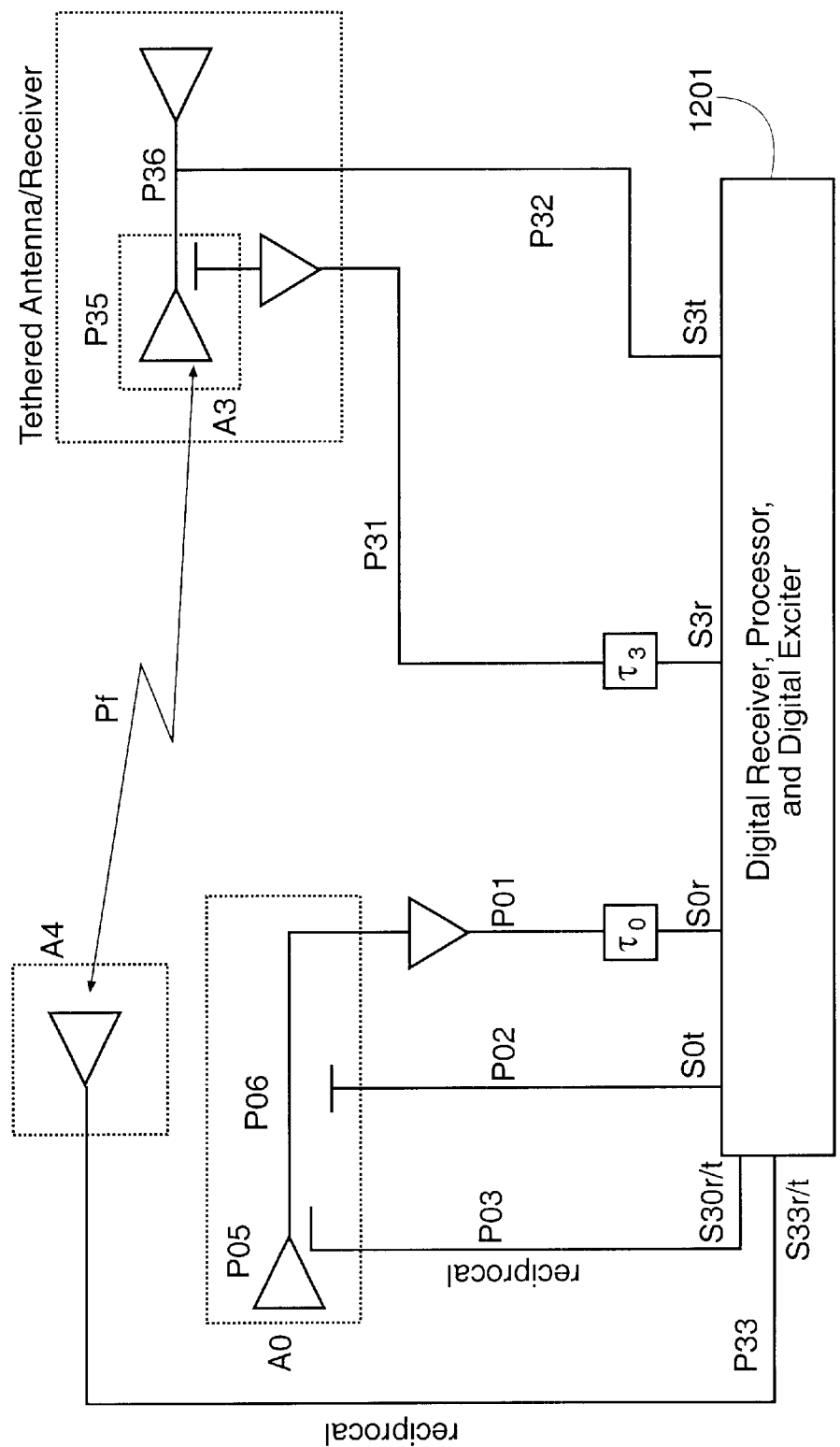
FIG. 12 shows a diagram of the simplified self-calibration arrangement used by the invention.

FIG. 9, FIG. 10 and FIG. 11 are included herein to explain how TDOA can be measured and why the analog delay elements $\tau_0$, $\tau_1$ and $\tau_2$ are needed in FIG. 6 and $\tau_0$ and $\tau_3$ are needed in FIG. 12. First the radio frequency (RF) signal from an emitter can be modeled as:

$$\sin(\omega_{RF}t) \tag{29}$$

The delayed signal arriving at a receiver antenna can then be written as:

$$\sin[\omega_{RF}(t-\tau)] \tag{30}$$

After mixing with the local oscillator (LO) frequency and filtering the received signal becomes:

$$\sin[(\omega_{IF}t-\omega_{RF}\tau)] \tag{31}$$

where $\omega_{IF}=\omega_{RF}-\omega_{LO}$. Notice that the delay has become a phase term and is ambiguous. Therefore $\tau$ is ambiguous. Now let us model the envelope of the IF pulse as a trapezoidal pulse (a "rectangular-like" pulse with a linear rise time). The result is shown in FIG. 9. Also modeled in FIG. 9 are the digital clock sample times for a clock frequency of 100 megahertz (MHz). These are the vertical lines every 10 nanoseconds.

FIG. 9 shows two received IF signals. Both signals actually oscillate about zero but are shown offset by ±3 for clarity of the plot. The relative amplitude of the FIG. 9 signals is 2. The relative time difference is 14.923 nanoseconds. The first clock sample arbitrarily occurs at time 0 and neither signal is present. The next time sample occurs at time 10. Note that the first (upper) signal is present but not the second. The third time sample occurs at time 20. Now both signals are present. Therefore it has been determined from FIG. 9 that the time difference of arrival is greater than 0 and less than 20.

FIG. 10 shows the results after $\tau_0$ and $\tau_1$ have been iteratively adjusted until the sample times at 10 and 20 nanoseconds are 0.707 (3 dB in power) of the average value of the envelope. FIG. 10a is a plot of both the envelope and the in phase (I) component of the signals. FIG. 10b is a plot of both the envelope and the quadrature (Q) component of the signals. FIG. 10c is a plot of the two envelopes. In FIG. 10c the arbitrary offset of ±3 has been removed. Note in FIG. 10c that the ratio of the rise time of each pulse to the average value of the envelope is the same at the time-samples at 10 and 20 respectively. This has been determined without ambiguity. Note also that we did not have to adjust $\tau_0$ until the upper signal was aligned with the lower signal. Therefore the FIG. 6 delays $\tau_0$ and $\tau_1$ need only be as long as the sample clock steps.

FIG. 11 is another example. In this example signal two arrives before signal 1. Comparing this example with FIG. 9 we see that the actual TDOA is less than one clock step but the initial measurement is one clock step. In contrast in FIG. 9 the actual TDOA is greater than one clock step while the initial measurement is one clock step.

Self-Calibration of the FIG. 12 Tethered Antenna Interferometer

FIG. 12 in the drawings shows a self-calibration circuit suitable for use with a simplified elevation measurement interferometer such as that represented in FIG. 1b. Notwithstanding the difference of measuring azimuth and elevation, the self-calibration concept is similar to that recited above in connection with FIG. 6 and is as follows. Again first assume that short paths can be calibrated in the factory or during maintenance and will remain calibrated or can be compensated with temperature sensing lookup table or simple algorithm. The paths needing calibration are again long paths and paths with active components such as amplifiers. Specifically, paths P01 and P31 in FIG. 12 need calibration. In FIG. 12 paths P01, P02, and P03 are the same as in FIG. 6 and P01 is previously calibrated by equation 25. To explain the FIG. 12 calibration process one needs to include FIG. 12, FIG. 7 and FIG. 8 and their continuity. FIG. 12 is the overall figure and FIG. 7 and FIG. 8 represent details inside the box 1201. The other paths are added merely to calibrate path P31.

FIG. 7a also describes the receiver functionality connected to the inputs of S0r and S3r of the receiver 1201 in FIG. 12. The FIG. 7a functionality is again to convert the signal from a high frequency to a lower frequency that can be sampled by the analog to digital (A/D) converter 702. There may be multiple stages of down conversion not shown. There may also be multiple stages of signal amplification to offset the loss of the mixer or mixers 700. FIG. 7b is the up conversion from a digital signal to the high frequency signal. This up conversion may also contain multiple stages.

Self-calibration of the FIG. 12 tethered antenna apparatus, including the tethered antenna arrangements in the FIG. 2 and FIG. 3 drawings, may be accomplished as follows. First a signal is injected into P31 from S33t. If P33 were known then P31 would be calibrated. However, P33 is not known. It is along path from the center portion of the aircraft to an aft antenna through free space to the tethered antenna. By adding another unknown path P32 to inject a signal into both P31 and P33 all three paths can be calibrated. The three equations and three unknowns are as follows. These are determined by starting with FIG. 8, going to FIG. 12 and ending in FIG. 7 for the first equation, equation 32.

$$S33t+P3t+P3ta+P33+P31=S3r \quad (32)$$

Starting in FIG. 7b, going to FIG. 12 and ending in FIG. 7a for the second equation.

$$S3t+P32+P36+P31=S3r \quad (33)$$

And finally staring in FIG. 7b going to FIG. 12 and ending in FIG. 8 for the third equation.

$$S3t+P32+P36+P33+P3ra+P3r=S33r \quad (34)$$

These three equations can then be written in matrix form $$\begin{bmatrix} 1 & 0 & 1 \\ 1 & 1 & 0 \\ 0 & 1 & 1 \end{bmatrix} \begin{bmatrix} P31 \\ P32 \\ P33 \end{bmatrix} = \begin{bmatrix} S3r33t - P3t - P3ta \\ S3r3t - P36 \\ S33r3t - P3r - P3ra - P36 \end{bmatrix} \quad (35)$$

For equation (35) it is assumed that all the paths in the right matrix are known. Also the notation is change to represent S3r–S33t by the short hand notation of S3r33t, and similarly S3r–S3t by S3r3t, and S33r–S3t by S33r3t. Note that both P3t and P3r are passive so in reality are uncalibrated.

The next step is to solve matrix equation (35) and more precisely to solve for P31. The first step in this sequence is to solve the matrix equation, which gives:

$$\begin{bmatrix} P31 \\ P32 \\ P33 \end{bmatrix} = \begin{bmatrix} .5 & .5 & -.5 \\ -.5 & .5 & .5 \\ .5 & -.5 & .5 \end{bmatrix} \begin{bmatrix} S3r33t - P3t - P3ta \\ S3r3t - P36 \\ S33r3t - P3r - P3ra - P36 \end{bmatrix} \quad (36)$$

From equation (36) P31 is:

$$P31=0.5\{(S3r33t+S3r3t-S33r3t)+(P3r-P3t)+(P3ra-P3ta)\} \quad (37)$$

This can be rewritten as:

$$P31=0.5\{(S31)+(P3r-P3t)+(P3ra-P3ta)\} \quad (38)$$

where S31=the three measured TDOA's from equation (37).

Note that P3ra and P3ta are short passive paths that can be calibrated in the factory. The factory arrangement could be that P3ra=P3ta when delivered and thus the term can be dropped from equation (38).

If the system is manufacture such that P3ra=P3ta then equation (38) can be rewritten as:

$$P31=0.5*S31+0.5(P3r-P3t) \quad (39)$$

Since the purpose of the invention is to measure TDOA and not absolute time of arrival at the antennas the self-calibration results of equations (25), and (39) are sufficient. That is the TDOA between antennas 0 and 3 is:

$$TDOA\_a=TDOA\_m+(P31-P01) \quad (40)$$

where TDOA_a is the TDOA at the two antennas and TDOA_m is the measured TDOA at the receiver. Substituting for P31 and P01 in equation (40) gives:

$$TDOA\_a=TDOA\_m+0.5(S31-S01) \quad (41)$$

and since S31 and S01 are measured during the self-calibration process TDOA_a has been determined. The elevation angle to the emitter can then be determined by the following equation:

$$\theta_3 = \cos^{-1}(TDOA_3 * c/L_3) \quad (42)$$

where $L_3$ is the separation between the antennas A0 and A3. The location of A0 is determined by the Global Positioning System (GPS) and the location of A3 is determined by differential GPS.

The function of the present invention is therefore to locate a moving emitter in azimuth, elevation, and range from a moving platform using a system inclusive of three large baseline interferometers. Two of the interferometers locate the emitter in azimuth by measurement of time difference of arrival signal properties and determination of signal angle of arrival data. The intersection of the two angles determined by this time difference of arrival algorithm provides a range measurement. A third interferometer determines elevation. Notably each of these interferometer angular and distance determinations are accomplished in the present invention without use of the time difference of arrival rate data employed in my first locator system, the system described in my now issued and above-identified U.S. Pat. No. 6,255, 992.

With sufficient signal to noise characteristics and measurement accuracy, the three-interferometer system of the present invention locates a moving emitter using only the data of one received pulse. In the invention two interferometers are nominally disposed in parallel relationship and the third disposed orthogonal to that pair; other dispositions are possible however. The invention may be implemented with one interferometer being formed by a right wing tip antenna and a nose antenna on an aircraft, the second interferometer with a left wing tip antenna and a nose antenna, and the third with a vertical tail antenna and a nose antenna. A tethered receiver-located antenna however significantly increases the interferometer baseline dimension, the accuracy of the angle of arrival determination and the usable system range. A primary application for the invention thus includes aircraft of either the manned or unmanned types functioning as the signal-receiving platform. The invention may also be implemented at a ground site or on a ship. For these latter applications the tethered antenna may of course be replaced with fixed antennas of the desired large baseline separation distance.

Although the present invention is disclosed herein in a manner primarily contemplating the use of radio frequency signals, and most plausibly radio frequency-signals of microwave frequency range and includes antennas suited to reception of such radio frequency signals, the invention is not limited to the use of such radio frequency signals.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular scope of the invention as determined by the appended claims when interpreted in accordance with the breadth to which they are fairly, legally and equitably entitled.

I claim:

1. Passive moving signal source relative-locating apparatus comprising the combination of:
   a time difference of arrival interferometer algorithm airborne signal locating system disposed within signal reception range of said moving signal source;
   multi-channel signal reception port apparatus disposed in physically segregated locations attending an aircraft carrying said airborne signal locating system;
   said multi-channel signal reception apparatus including first signal reception port apparatus disposed on a first physical portion of said aircraft and connected with a receiver apparatus within said aircraft by a first signal delay-calibrated signal transmission path;
   said multi-path signal reception apparatus also including second signal reception port apparatus disposed proximate said aircraft and connected with said receiver apparatus within said aircraft by a second signal delay-calibrated signal transmission path;
   said multi-path signal reception apparatus also including third signal reception port apparatus disposed proximate said aircraft and connected with said receiver apparatus within said aircraft by a third signal delay-calibrated signal transmission path;
   said receiver apparatus within said aircraft including time difference of arrival measurement apparatus selectively connecting with said first, second and third signal reception port apparatus by said first path, second path and third path signal delay-calibrated signal transmission paths respectively;
   said time difference of arrival measurement apparatus including angular measurement computation apparatus determining from selected pairs of measured time difference of arrival signals first, second and third angular relationships respectively between said first, second and third signal reception ports of said moving aircraft carrying said airborne signal locating apparatus and said moving airborne signal source;
   said time difference of arrival measurement apparatus further including distance computation apparatus determining from selected pairs of said first, second and third angular relationships a straight line measurement between said moving aircraft carrying said airborne signal locating apparatus and said moving airborne signal source.

2. The passive moving signal source relative-locating apparatus of claim 1 wherein said multi-channel signal reception port apparatus comprises radio frequency antenna elements disposed on wingtips of said aircraft, on a nose portion of said aircraft and on a tail portion of said aircraft.

3. The passive moving signal source relative-locating apparatus of claim 1 wherein said multi-channel signal reception port apparatus comprises radio frequency antenna elements disposed on wingtips of said aircraft and on an aircraft-trailing element tethered to said aircraft.

4. The passive moving signal source relative-locating apparatus of claim 1 wherein said multi-channel signal reception port apparatus comprises radio frequency antenna elements disposed on a selected combination of wingtips of said aircraft, a nose portion of said aircraft, a tail portion of said aircraft and a trailing element tethered to said aircraft.

5. The passive moving signal source relative-locating apparatus of claim 1 wherein said multi-channel signal reception port apparatus includes a plurality of trailing elements tethered to said aircraft.

6. The passive moving signal source relative-locating apparatus of claim 1 further including signal delay calibrating apparatus connected with a plurality of said multi-channel signal reception apparatus signal delay-calibrated signal transmission paths.

7. The passive moving signal source relative-locating apparatus of claim 1 wherein said signal delay calibrating apparatus includes signal generating apparatus connected by signal coupling apparatus to signal transmission elements in said locating apparatus.

8. The passive moving signal source relative-locating apparatus of claim 1 wherein said time difference of arrival measurement apparatus further includes moving signal source velocity determination apparatus.

9. The method of determining instantaneous relative position of a physically moving signal source with respect to a physically moving search platform, said method comprising the steps of:
measuring, using time difference of arrival signals, a first angular relationship between a first portion of said physically moving search platform and said physically moving signal source;
assessing, using time difference of arrival signals, a second angular relationship between a second portion of said physically moving search platform and said physically moving signal source;
determining, using time difference of arrival signals, a second angular relationship between a third portion of said physically moving search platform and said physically moving signal source; and
computing from selected of said first angular relationship, said second angular relationship and said third angular relationship azimuth and elevation components of a physical separation distance along a vector connecting said physically moving search platform and said physically moving signal source.

10. The method of determining instantaneous relative position of a physically moving signal source with respect to a physically moving search platform of claim 9 wherein:
said physically moving signal source is located on a first moving aircraft;
said physically moving search platform is located on a second moving aircraft;
said measured first angular relationship comprises an azimuth angle relationship between said first and second aircraft;
said determined second angular relationship comprises an azimuth angle relationship between said first and second aircraft; and
said determined third angular relationship comprises an elevation angle relationship between said first and second aircraft.

11. The method of determining instantaneous relative position of a physically moving signal source with respect to a physically moving search platform of claim 10 further including the step of ascertaining from changes in said first angular relationship, said second angular relationship and said third angular relationship a relative velocity between said first and second aircraft.

12. The method of determining instantaneous relative position of a physically moving signal source with respect to a physically moving search platform of claim 9 wherein said steps of measuring, assessing and determining using time difference of arrival signals include collecting radio frequency signals from antennas disposed on a selected combination of wingtips of a physically moving search platform aircraft, a nose portion of said aircraft, a tail portion of said aircraft and a trailing element tethered to said aircraft.

13. The method of determining instantaneous relative-position of a physically moving signal source with respect to a physically moving search platform of claim 9 wherein said steps of measuring, assessing and determining using time difference of arrival signals include calibrating, for signal delay characteristics, signal transmission paths connecting said first, second and third portions of a physically moving search platform aircraft with a time difference of arrival computing location of said aircraft.

14. The method of determining instantaneous relative position of a physically moving signal source with respect to a physically moving search platform of claim 13 wherein said step of calibrating, for signal delay characteristics, includes injecting signals of known characteristics into signal transmission paths of an instantaneous relative position determination apparatus.

15. Passive algorithm physically moving signal source relatives locating apparatus comprising the combination of:
a physically moving locating platform disposed within reception range of said moving signal source;
multi-path signal reception apparatus disposed in physically segregated locations on said moving platform;
said multi-path signal reception apparatus including first path signal source to moving platform signal reception apparatus disposed on a first physical portion of said physically moving platform;
said multi-path signal reception apparatus also including second path signal source to moving platform signal reception apparatus disposed on a displaced second physical-portion of said physically moving platform;
said multi-path signal reception apparatus further including third path signal source to moving platform signal reception apparatus disposed on an additionally displaced third physical portion of said physically moving platform;
time difference of arrival measurement apparatus connected with said first path, second path and third path signal source to moving platform signal reception apparatus;
said time difference of arrival measurement apparatus including angular measurement computation apparatus determining from each measured time difference of arrival signal originating in said first, second and third path signal source to moving platform signal reception apparatus first second and third angular relationships respectively between each said first, second and third physical portions of said physically moving platform and said moving signal source; and
distance computation apparatus determining from said first second and third angular relationships a measure of instantaneous physical distance between said physically moving signal source and said physically moving platform.

16. The passive algorithm physically moving signal source relative locating apparatus of claim 15 further including geo-position source apparatus communicating earth position data to said distance computation apparatus and enabling computation of a geo position location of said moving signal source.

17. The passive algorithm physically moving signal source relative locating apparatus of claim 15 wherein said signal source to moving platform signal reception apparatus includes a plurality of radio frequency signal antenna elements selectively disposed on said moving platform and radio frequency signal transmission line elements of known signal delay characteristics connecting said antenna elements with a moving platform disposed radio frequency receiver element.

18. The passive algorithm physically moving signal source relative locating apparatus of claim 15 wherein said distance computation apparatus includes signal source velocity computation apparatus responsive to a plurality of successive signal source location determinations.

* * * * *